US007373781B2

(12) United States Patent
Reback et al.

(10) Patent No.: US 7,373,781 B2
(45) Date of Patent: May 20, 2008

(54) METHODS AND APPARATUS FOR INJECTING CLEANING FLUIDS INTO COMBUSTORS

(75) Inventors: Scott Mitchell Reback, Brockton, MA (US); Stephen Thomas Sebeika, Malden, MA (US)

(73) Assignee: General Electric Company, Schenectady, NY (US)

( * ) Notice: Subject to any disclaimer, the term of this patent is extended or adjusted under 35 U.S.C. 154(b) by 229 days.

(21) Appl. No.: 11/434,433

(22) Filed: May 15, 2006

(65) Prior Publication Data

US 2007/0062201 A1 Mar. 22, 2007

Related U.S. Application Data

(62) Division of application No. 10/464,596, filed on Jun. 18, 2003, now Pat. No. 7,065,955.

(51) Int. Cl.
*F02C 7/30* (2006.01)
*B08B 9/032* (2006.01)

(52) U.S. Cl. ...................................... 60/772; 134/22.12

(58) Field of Classification Search .................. 60/772, 60/775, 737, 748, 746, 747, 39.55
See application file for complete search history.

(56) References Cited

U.S. PATENT DOCUMENTS 4,713,120 A 12/1987 Hodgens, II et al.
4,834,912 A 5/1989 Hodgens, II et al.
5,273,395 A 12/1993 McDermott
5,679,174 A 10/1997 Buongiorno
5,868,860 A 2/1999 Asplund
6,310,022 B1 10/2001 Amiran
6,491,048 B1 12/2002 Foster
6,503,334 B2 * 1/2003 Ruiz et al. ............... 134/22.12
6,630,198 B2 10/2003 Ackerman et al.
6,932,093 B2 8/2005 Ogden et al.
7,018,965 B2 3/2006 Yan et al.
7,065,955 B2 6/2006 Reback et al.
7,185,663 B2 3/2007 Koch et al.

FOREIGN PATENT DOCUMENTS

JP 2001-214755 * 8/2001

* cited by examiner

*Primary Examiner*—Ted Kim
(74) *Attorney, Agent, or Firm*—William Scott Andes, Esq.; Armstrong Teasdale LLP

(57) ABSTRACT

A method details injecting water into a gas turbine engine to facilitate cleaning an inner surface of a combustor. The method comprises removing an axial fuel injector from the combustor, wherein the fuel injector includes a nozzle stem, and inserting a spray nozzle assembly into a fuel injector opening created within the combustor when the fuel injector was removed, wherein the spray nozzle assembly includes a popet nozzle that is coupled to a nozzle stem that is shaped substantially identically to the fuel injector nozzle stem removed from the combustor. The method also comprises coupling the spray nozzle assembly to the combustor such that the popet nozzle is inserted substantially concentrically into the combustor, and injecting water into the combustor through the spray nozzle assembly.

5 Claims, 5 Drawing Sheets

METHODS AND APPARATUS FOR INJECTING CLEANING FLUIDS INTO COMBUSTORS

CROSS-REFERENCE TO RELATED APPLICATIONS

This application is a divisional of U.S. patent application Ser. No. 10/464,596, filed Jun. 18, 2003, now U.S. Pat. No. 7,065,955 which is hereby incorporated by reference and is assigned to assignee of the present invention.

BACKGROUND OF THE INVENTION

This application relates generally to gas turbine engine combustors and, more particularly, to methods and apparatus for injecting cleaning fluids under pressure into assembled and on wing gas turbine engine combustors to facilitate removing build-up that degrades performance.

Gas turbine engines typically include a compressor for compressing air which is mixed with a fuel and channeled to a combustor wherein the mixture is ignited within a combustion chamber for generating hot combustion gases. At least some known combustors include a dome assembly, a cowling, and liners to channel the combustion gases to a turbine, which extracts energy from the combustion gases for powering the compressor, as well as producing useful work to propel an aircraft in flight or to power a load, such as an electrical generator. The liners are coupled to the dome assembly with the cowling, and extend downstream from the cowling to define the combustion chamber. At least some known dome assemblies include a structural member (herein referred to as a dome plate) with a venturi that extends downstream from the dome plate to channel fuel injected from a fuel injector towards the combustion chamber.

During operation, carbon may form along the venturi as a result of fuel impinging on an inner surface of the venturi. Over time, the carbon may build up and adversely effect engine performance. More specifically, carbon build-up may adversely effect airflow characteristics within the combustor and/or skew the accuracy and margin of performance instruments positioned within the engine flowpath. Accordingly, within at least some known combustors, when the performance of the combustor and/or engine deteriorates to a pre-determined level, the combustors are internally cleaned. However, because of accessibility limitations, the venturi areas of known combustors can not be effectively cleaned while the combustors are coupled within the engine without risking damage to other engine components. As such, generally an extensive and time-consuming removal and disassembly of the engine is required to provide access to the venturi areas of the combustors requiring cleaning.

BRIEF SUMMARY OF THE INVENTION

In one aspect, a method for injecting water into a gas turbine engine to facilitate cleaning an inner surface of a combustor, while the combustor remains assembled, is provided. The method comprises removing an axial fuel injector from the combustor, wherein the fuel injector includes a nozzle stem, and inserting a spray nozzle assembly into a fuel injector opening created within the combustor when the fuel injector was removed, wherein the spray nozzle assembly includes a popet nozzle that is retractable for assistance of assembly and is shaped substantially identically to the fuel injector nozzle stem removed from the combustor. The method also comprises coupling the spray nozzle assembly to the combustor such that the popet nozzle is inserted substantially concentrically into the combustor, and injecting water into the combustor through the spray nozzle assembly.

In another aspect, a spray nozzle assembly for injecting water into a gas turbine engine combustor is provided. The spray nozzle assembly includes a nozzle stem, a mounting flange, and a popet nozzle. The nozzle stem comprises an inlet and an outlet. The inlet is configured to couple in flow communication to a high-pressure water source. The mounting flange circumscribes the nozzle stem adjacent the nozzle outlet. The popet nozzle is coupled to the nozzle stem outlet. The mounting flange is for mounting the spray nozzle assembly to the combustor such that the popet nozzle extends from an upstream end of the combustor substantially concentrically into the combustor to discharge water into the combustor and impinge on the surfaces including deposits, such that damage to other areas of the combustor is facilitated to be eliminated.

In a further aspect, a gas turbine engine combustor spray nozzle assembly is provided. The spray nozzle includes a nozzle stem, a mounting flange, and a popet nozzle. The nozzle stem is coupled in flow communication to a cleaning fluid source that is configured to remove deposit build-up from an inner surface of the combustor. The popet nozzle is coupled to the nozzle stem outlet. The mounting flange circumscribes the nozzle stem for mounting the spray nozzle assembly to the combustor such that the popet nozzle extends from an upstream end of the combustor substantially concentrically into the combustor to discharge water into the combustor.

DETAILED DESCRIPTION OF THE INVENTION

Figure 1:
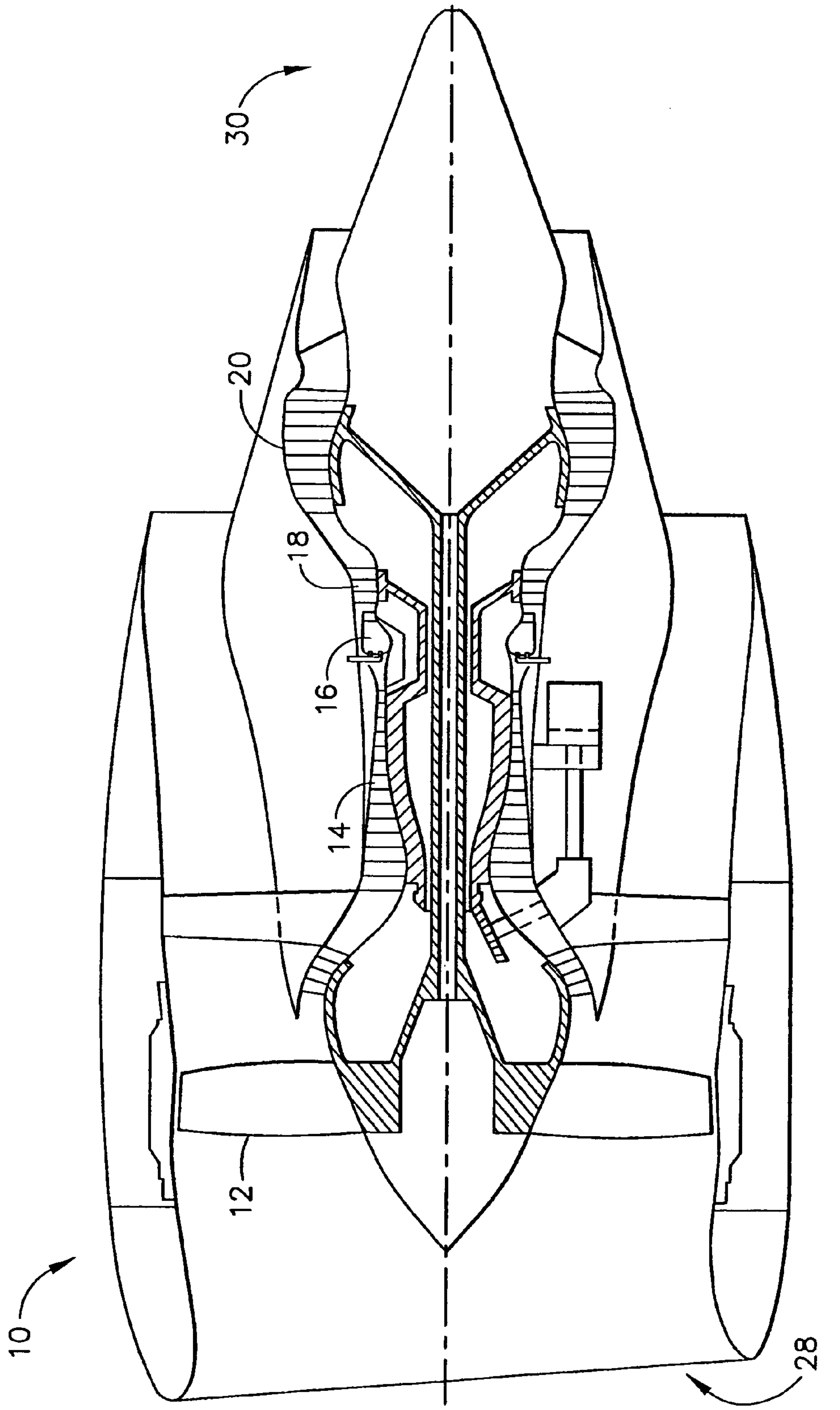
FIG. 1 is schematic illustration of a gas turbine engine.

FIG. 1 is a schematic illustration of a gas turbine engine 10 including a fan assembly 12, a high pressure compressor 14, and a combustor 16. Engine 10 also includes a high pressure turbine 18, a low pressure turbine 20, and a booster 22. Fan assembly 12 includes an array of fan blades 24 extending radially outward from a rotor disc 26. Engine 10 has an intake side 28 and an exhaust side 30. In one embodiment, the gas turbine engine is a CF-34 engine available from General Electric Company, Cincinnati, Ohio.

In operation, air flows through fan assembly 12 and compressed air is supplied to high pressure compressor 14. The highly compressed air is delivered to combustor 16. Airflow (not shown in FIG. 1) from combustor 16 drives turbines 18 and 20, and turbine 20 drives fan assembly 12.

Figure 2:
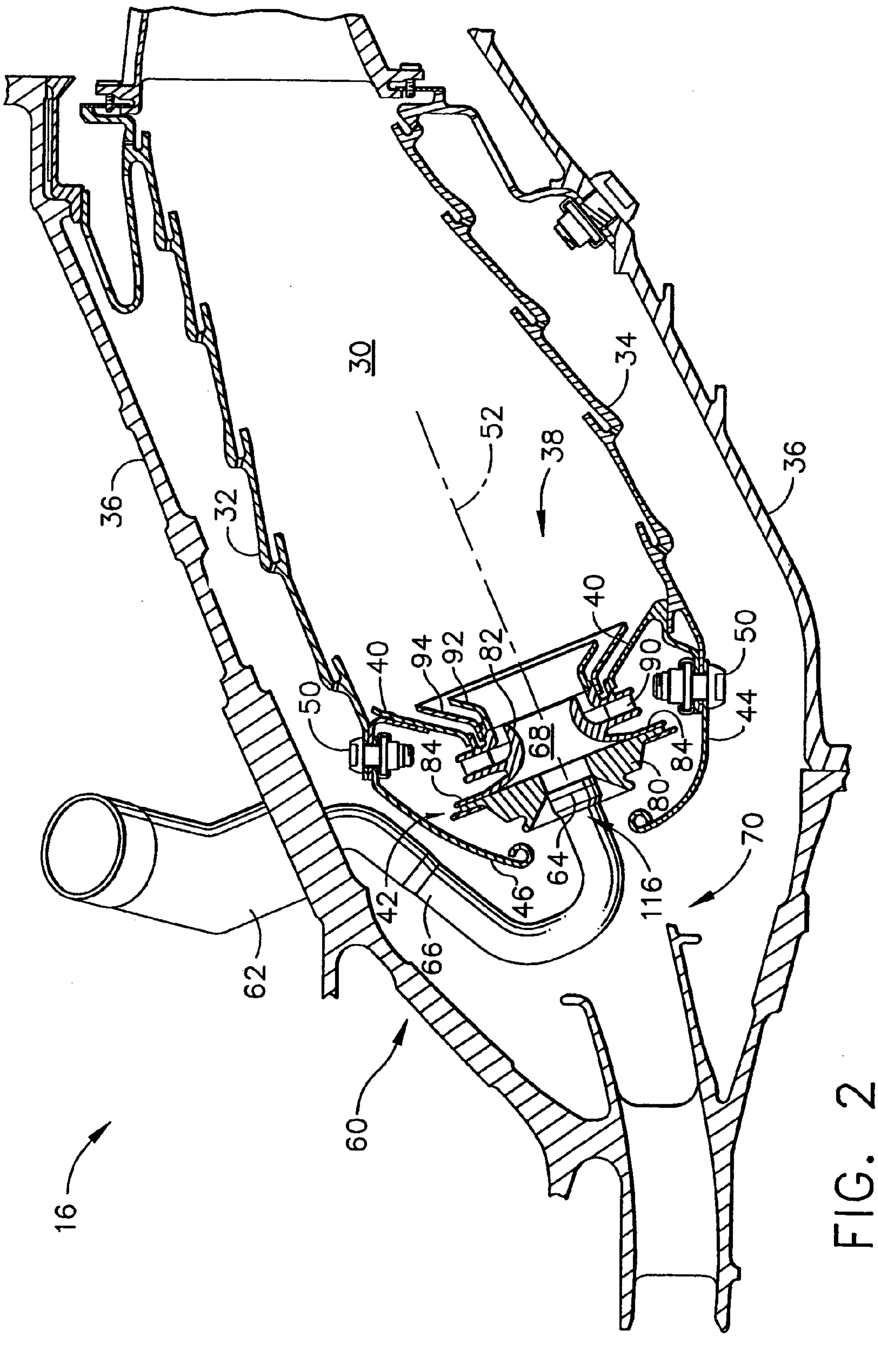
FIG. 2 is a cross-sectional view of an exemplary combustor that may be used with the gas turbine engine shown in FIG. 1.

FIG. 2 is a cross-sectional view of an exemplary combustor 16 for use with a gas turbine engine, similar to engine 10 shown in FIG. 1. More specifically, in the exemplary embodiment, combustor 16 is used with a CF-34 engine. Combustor 16 includes a combustion zone or chamber 30 defined by annular, radially outer and radially inner liners 32 and 34. More specifically, outer liner 32 defines an outer boundary of combustion chamber 30, and inner liner 34 defines an inner boundary of combustion chamber 30. Liners 32 and 34 are radially inward from an annular combustion chamber casing 36 which extends circumferentially around liners 32 and 34.

Combustor 16 also includes a dome assembly 38 including an annular dome 40 mounted upstream from outer and inner liners 32 and 34, respectively. Dome 40 defines an upstream end 42 of combustion chamber 30 and is coupled within combustor 16 by an inner cowl 44 and an outer cowl 46. More specifically, cowls 44 and 46 are fixedly coupled to dome 40 and liners 32 and 34 by fastener assemblies 50. Each dome 40 also has a center longitudinal axis of symmetry 52 that extends therethrough.

Fuel is supplied to combustor 16 through a fuel injection assembly 60 that includes a fuel nozzle valve 62 coupled in flow communication to a fuel nozzle 64 by a fuel nozzle stem 66 that extends therebetween. Fuel injection assembly 60 is coupled to combustor 16 by a mounting plate (not shown) that is coupled to combustion chamber casing 36 by a plurality of fasteners (not shown). More specifically, fuel injection assembly 60 is coupled to combustor 16 such that fuel nozzle 64 is substantially concentrically aligned with respect to dome 40, such that nozzle 64 extends downstream and substantially axially from an upstream end 70 of combustor 16 to discharge fuel into a fuel cup assembly 68.

In the exemplary embodiment, fuel cup assembly 68 includes a primary swirler 80 and a venturi 82 that includes a disc shaped mounting flange 84. Fuel cup assembly 68 also includes a secondary swirler 90, a sleeve 92, and a splash plate 94. The functions and mutual cooperation of the above-mentioned elements of combustor 16 and of fuel cup assembly 68 are well known in the art.

Figure 3:
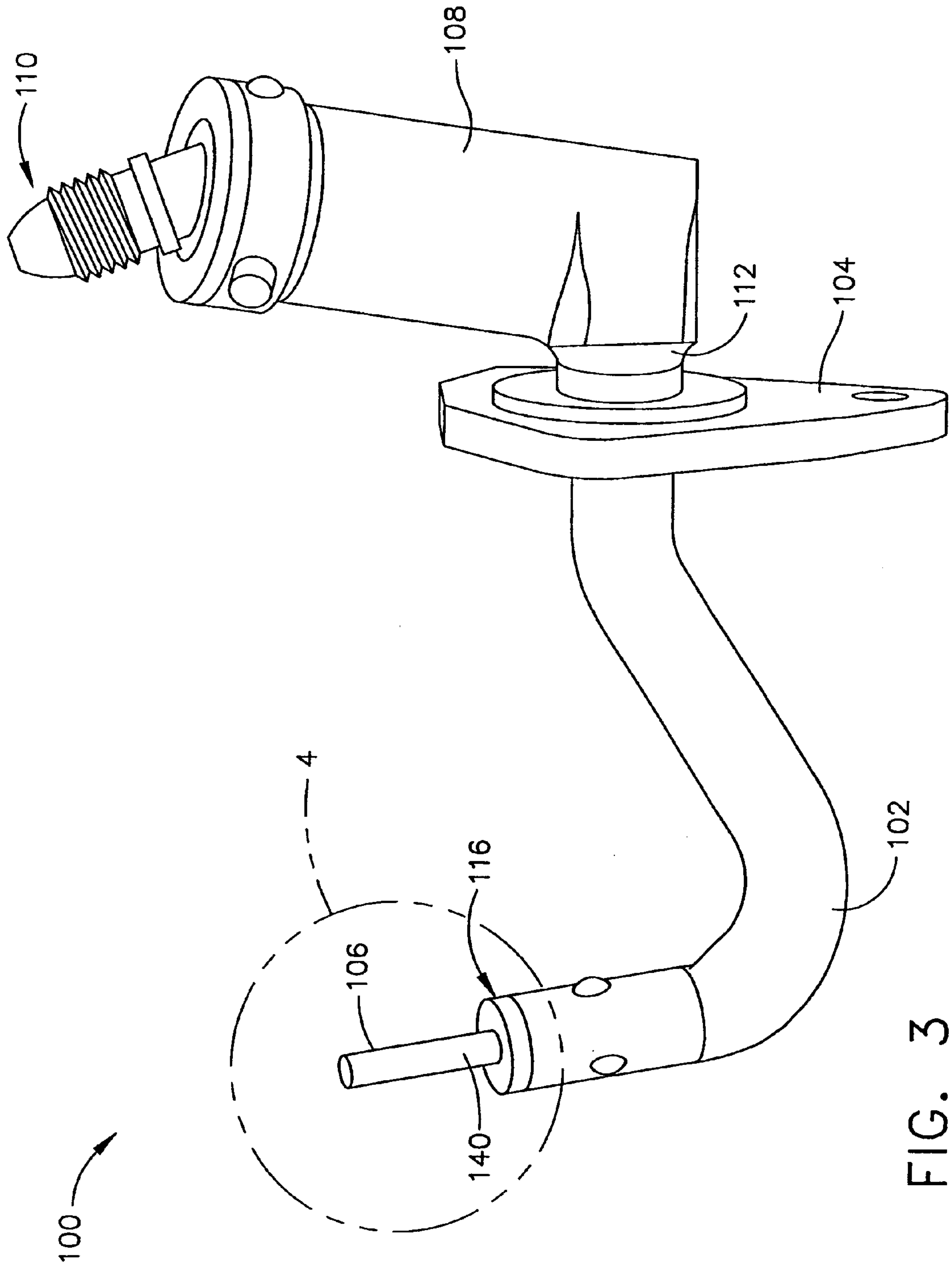
FIG. 3 is a side view of an exemplary spray nozzle assembly that may be used to clean the combustor shown in FIG. 2.
Figure 4:
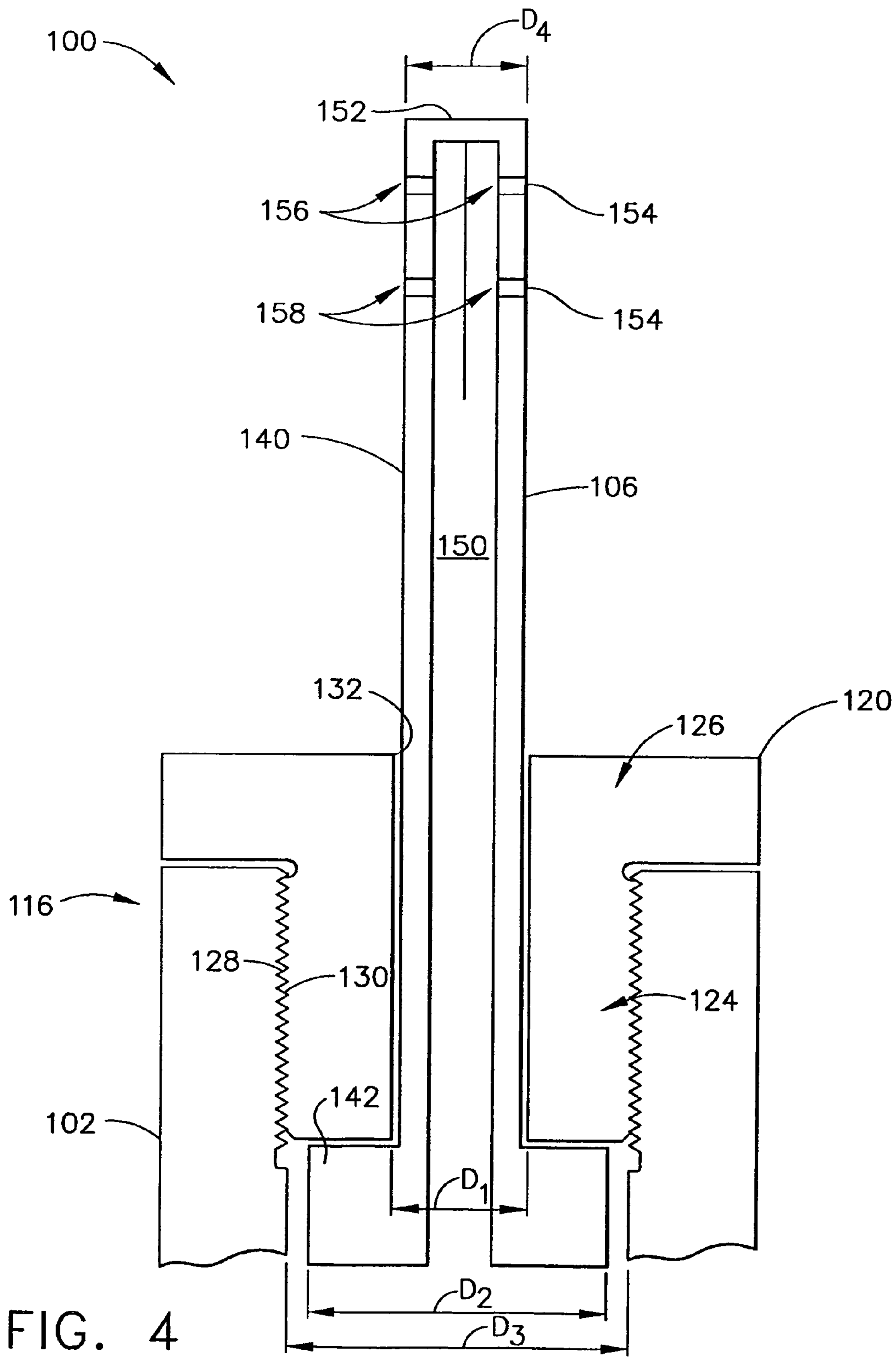
FIG. 4 is an enlarged cross-sectional view of a portion of the nozzle assembly shown in FIG. 3 and taken along area 4.
Figure 5:
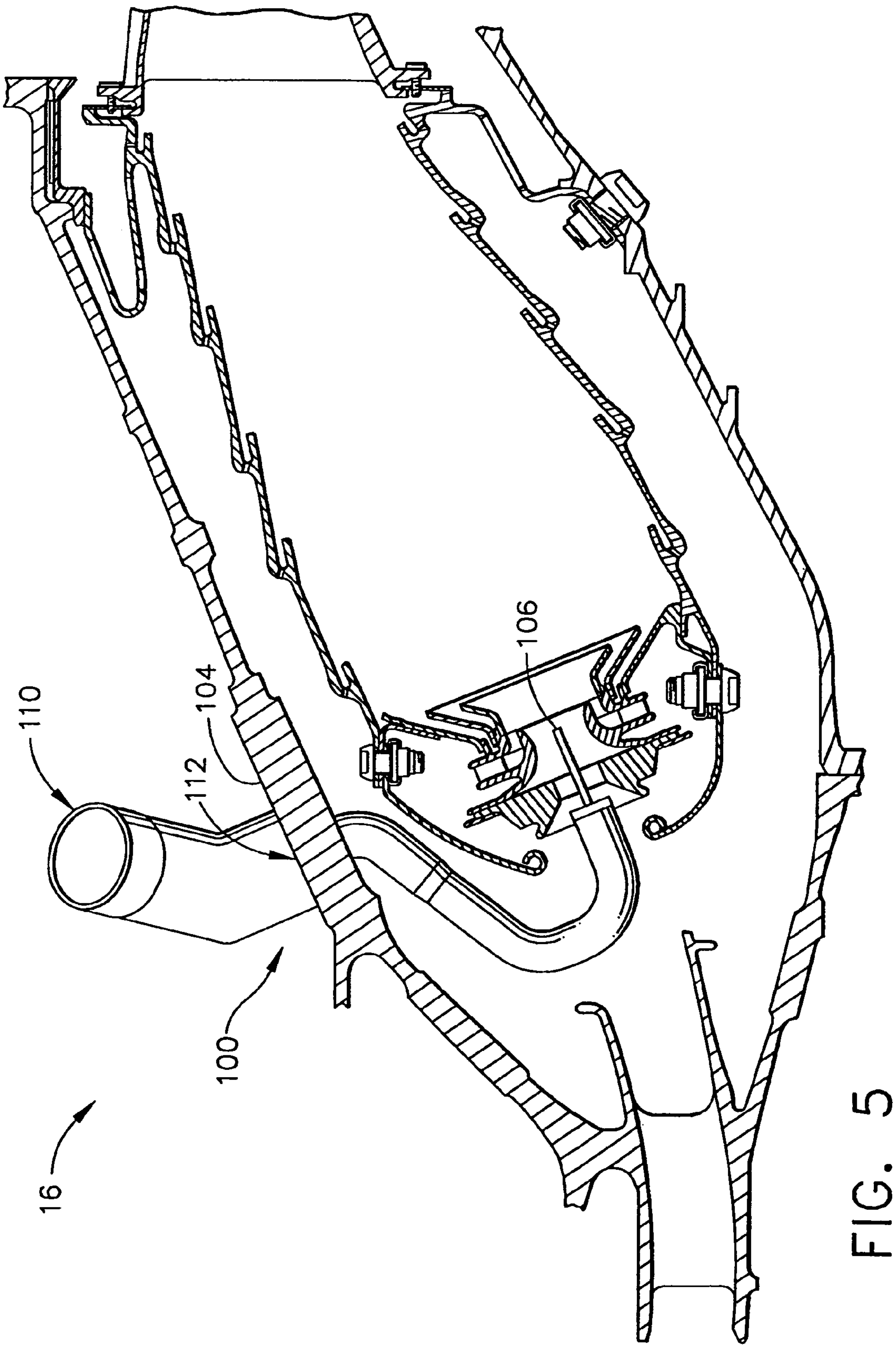
FIG. 5 is a cross-sectional view of the spray nozzle assembly shown in FIG. 2 coupled in position within the combustor shown in FIG. 2.

FIG. 3 is a side view of an exemplary spray nozzle assembly 100 that may be used to clean combustor 16, and FIG. 4 is an enlarged cross-sectional view of a portion of spray nozzle assembly 100 taken along area 4. FIG. 5 is a cross-sectional view of spray nozzle assembly 100 coupled in position within combustor 16 to facilitate cleaning combustor 16. Spray nozzle assembly 100 includes a nozzle stem 102, a mounting flange 104, a popet nozzle 106, and a nozzle valve 108. In the exemplary embodiment, nozzle stem 102 is a known gas fuel injector nozzle stem that has been modified and is coupled within spray nozzle assembly 100. In an alternative embodiment, depending on a configuration of the combustor being cleaned, and more specifically, depending on a configuration of the fuel injection assembly used with the combustor being cleaned, and as described in more detail below, spray nozzle assembly 100 does not include mounting flange 104 or nozzle valve 108.

Nozzle valve 108 includes an inlet side 110 and an outlet side 112, and is coupled in flow communication to popet nozzle 106 by nozzle stem 102. More specifically, nozzle valve 108 is coupled in flow communication between a cleaning fluid source and nozzle stem 102. In the exemplary embodiment, the cleaning fluid source is a pressurized water source. Alternatively, other sources of cleaning fluid may be used.

Nozzle stem 102 extends from nozzle valve 108 to a discharge end 116. Popet nozzle 106 is coupled to nozzle stem discharge end 116 by a retainer 120. In the exemplary embodiment, nozzle stem discharge end 116 has been modified to enable retainer 120 to be threadingly coupled to nozzle stem discharge end 116.

Retainer 120 includes a substantially cylindrical engagement portion 124 that extends substantially perpendicularly from an annular end or flange portion 126. Engagement portion 124 includes a plurality of threads 128 that mate with a plurality of threads 130 formed within nozzle stem discharge end 116. An opening 132 extends through retainer 120. More specifically, opening 132 has a substantially constant inner diameter $D_1$. Flange portion 126 enables retainer 120 to be securely coupled to nozzle stem 102 in sealing contact between nozzle stem 102 and retainer 120.

Popet nozzle 106 is slidably coupled to nozzle stem discharge end 116 by retainer 120. Specifically, popet nozzle 106 includes a substantially cylindrical discharge tube 140 that extends substantially perpendicularly from an end flange 142. End flange 142 has a diameter $D_2$ that is slightly smaller than an inside diameter $D_3$ of nozzle stem 102, and as such, is larger than retainer opening diameter $D_1$.

Popet nozzle discharge tube 140 has an outer diameter $D_4$ that is slightly smaller than retainer opening diameter $D_1$. Accordingly, popet nozzle discharge tube 140 is slidably received within retainer opening 132, and popet nozzle end flange 142 ensures retainer 120 retains popet nozzle 106 within nozzle stem 102.

Popet nozzle 106 is hollow and includes a cavity 150 defined therein that does not extend all the way through nozzle 106, but rather extends from end flange 142 to a solid end 152 that is opposite end flange 142. A plurality of openings 154 extend through popet nozzle discharge tube 140 adjacent end 152. More specifically, openings 154 are spaced circumferentially around discharge tube 140 and are in flow communication with nozzle cavity 150. Openings 154 are substantially axially aligned with respect to discharge tube 140. More specifically, openings 154 are arranged in a pair of axially-separated rows 156 and 158. The number of openings 154, rows 156 or 158, and size of each respective opening, is variably selected to enable water to be discharged substantially circumferentially and uniformly to facilitate cleaning combustor 16. In the exemplary embodiment, each row 156 and 158 includes six circumferentially-spaced openings 154.

Mounting flange 104 circumscribes nozzle stem 102 and facilitates coupling spray nozzle assembly 100 in position within combustor 16. More specifically, in the exemplary embodiment, mounting flange 104 is sized identically to a mounting flange used to retain the fuel injection assembly within the combustor being cleaned.

During use, initially a combustor is inspected using a known inspection technique, such as may be possible with a boroscope, to determine if contaminant or carbon buildup within the combustor is sufficient to warrant cleaning of the combustor. For example, in at least some known combustors, including combustor 16, carbon build-up is more prevalent along aft portions and inner surfaces 180 of venturi 82 within fuel cup assembly 68.

A fuel injection assembly, such as injection assembly 60 (shown in FIG. 2), is removed from the combustor to be cleaned, and a spray nozzle assembly 100 is coupled in position within the combustor being cleaned. More specifically, spray nozzle assembly 100 is at least partially inserted into the combustor to be in a position that is substantially the same position as the fuel injection assembly that was removed. As such, when spray nozzle assembly 100 is coupled to the combustor being cleaned, popet nozzle 106 extends substantially concentrically into the combustor from an upstream side of the combustor. More specifically, in the exemplary embodiment, mounting flange 104 is secured to combustor 16 in the same position as the mounting flange used with the fuel injection assembly removed, such that spray nozzle assembly 100 is retained in position within combustor 16 during the combustor cleaning process.

Nozzle valve 108 is then coupled to a cleaning fluid source, and when pressurized cleaning fluid is routed to spray nozzle assembly 100, popet nozzle 106 is forced downstream from a retracted position within nozzle stem 102 causing popet nozzle end flange 142 to contact retainer 120. When popet nozzle end flange 142 is against retainer 120, popet nozzle discharge tube 140 is fully extended downstream from retainer 120. Because discharge tube end 152 is solid, the cleaning fluid is discharged radially outward into the combustor through openings 154 and towards the venturi, rather than being discharged axially downstream from spray nozzle assembly 100. More specifically, the cleaning fluid is discharged substantially uniformly and circumferentially from spray nozzle assembly 100 to flush against the venturi inner surface to facilitate removing build-up from such surfaces. Accordingly, because spray nozzle assembly 100 is sized and shaped substantially similarly to the fuel injection assembly removed from the combustor, accessibility issues that may be present with known combustor washing methods are eliminated. Furthermore, and as a result, spray nozzle assembly 100 may be used to clean combustors without removing the combustor from the engine, or removing the engine from an associated aircraft.

The above-described spray nozzle assembly is cost-effective and highly reliable. The spray nozzle assembly uses either components that are sized and shaped substantially identically to existing fuel injection assemblies, or modifies existing fuel injection assemblies for use in cleaning combustors. Accordingly, the spray nozzle assemblies are inserted into voids created when fuel injection assemblies are removed from the combustors to enable cleaning fluid to be discharged substantially uniformly and circumferentially towards the inner surfaces of the combustor venturis. As a result, the spray nozzle assemblies facilitate enhanced cleaning of combustors in a cost-effective manner without requiring the combustor to be removed from the engine.

Exemplary embodiments of combustors and spray nozzle assemblies are described above in detail. The combustors and spray nozzle assemblies are not limited to the specific embodiments described herein, but rather, components of each assembly may be utilized independently and separately from other components described herein. For example, each spray nozzle component can also be used in combination with other spray nozzle components and combustors. Moreover, the methods described herein, are not limited to the specific combustor embodiments described herein.

While the invention has been described in terms of various specific embodiments, those skilled in the art will recognize that the invention can be practiced with modification within the spirit and scope of the claims.

What is claimed is:

1. A method for injecting water into a gas turbine engine to facilitate cleaning an inner surface of a combustor, said method comprising:

removing an axial fuel injector from the combustor, wherein the fuel injector includes a nozzle stem;

inserting a spray nozzle assembly into a fuel injector opening created within the combustor when the fuel injector was removed, wherein the spray nozzle assembly includes a popet nozzle that is coupled to a nozzle stem that is shaped substantially identically to the fuel injector nozzle stem removed from the combustor;

coupling the spray nozzle assembly to the combustor such that the popet nozzle is inserted substantially concentrically into the combustor; and injecting water into the combustor through the spray nozzle assembly.

2. A method in accordance with claim 1 wherein coupling the spray nozzle assembly to the combustor further comprises coupling the spray nozzle assembly to the combustor using a mounting flange that circumscribes the spray nozzle assembly nozzle stem.

3. A method in accordance with claim 1 wherein injecting water into the combustor through the spray nozzle assembly further comprises only injecting water radially outwardly from the popet nozzle with respect to the combustor and towards the combustor inner surface.

4. A method in accordance with claim 1 wherein injecting water into the combustor through the spray nozzle assembly further comprises injecting water radially outwardly through a row of circumferentially-spaced openings extending around the popet nozzle.

5. A method in accordance with claim 1 wherein injecting water into the combustor through the spray nozzle assembly further comprises injecting water radially outwardly through a plurality of rows of circumferentially-spaced openings extending around the popet nozzle, wherein adjacent rows of openings are axially spaced along the popet nozzle.

* * * * *